United States Patent Office 3,495,484
Patented Feb. 17, 1970

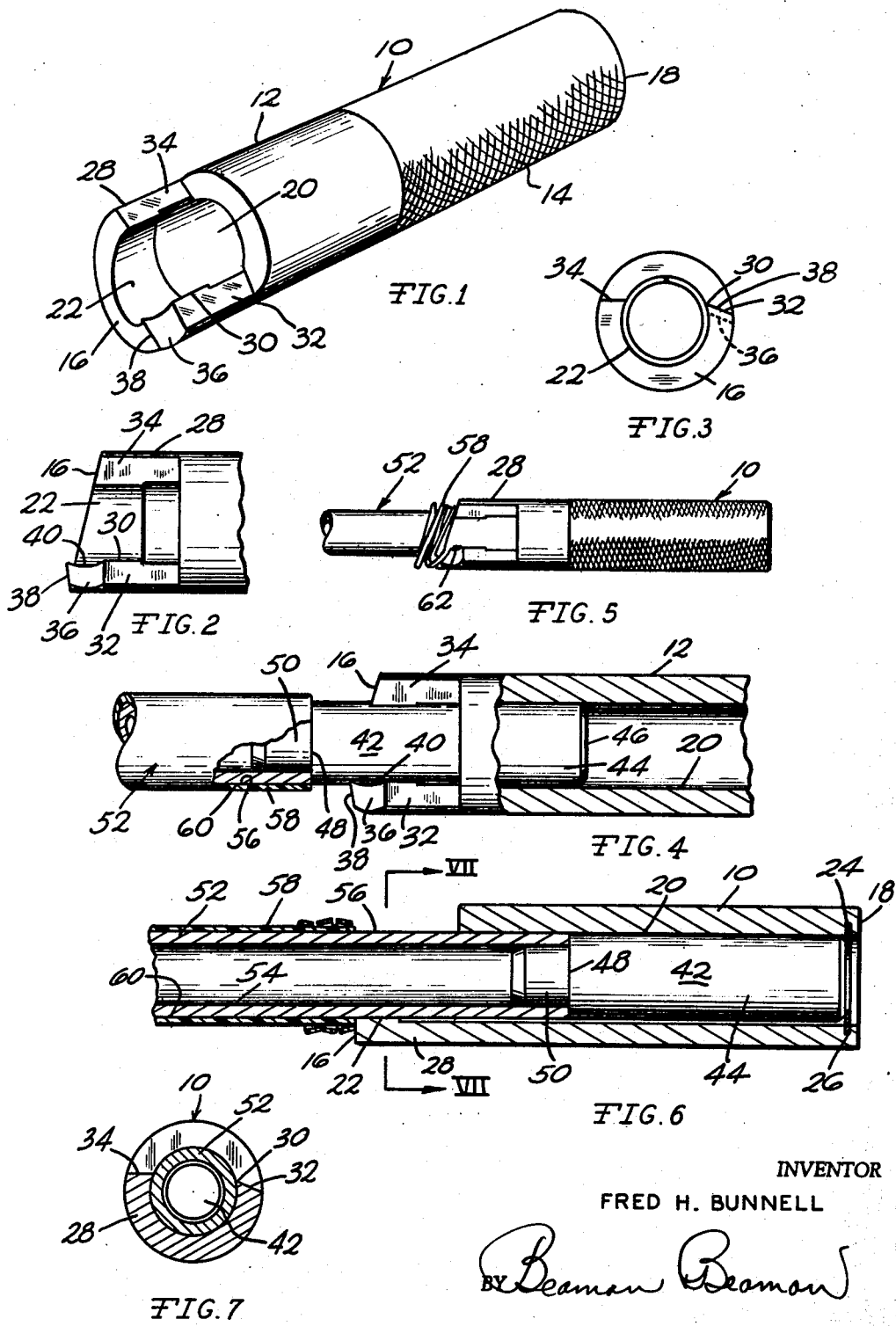

3,495,484
CONDUIT COATING REMOVER
Fred H. Bunnell, 719 Woodfield Drive,
Jackson, Mich. 49203
Filed Sept. 18, 1967, Ser. No. 668,571
Int. Cl. H02g 1/12; B26b 27/00, 29/00
U.S. Cl. 81—9.5                                    8 Claims

ABSTRACT OF THE DISCLOSURE

A tool for removing a protective coating from the exterior surface of a conduit in order to permit the conduit to be connected to a fitting wherein the tool forms a radial incision in the covering prior to removing the covering from the conduit and relative rotation occurs between the conduit and tool during coating removal.

BACKGROUND OF THE INVENTION

The field of the invention pertains to the art of removing a coating from the exterior surface of a conduit without inflicting damage upon the conduit exterior surface. The invention relates to that type of tool which is rotated concentric to the article being operated upon, and the tool is of the hand, manually operated type.

Rotating devices are known which may be employed in conjunction with a conduit, such as shown in U.S. Patent 3,075,219. However, coatings of the type with which the invention is to be employed are normally removed by conventional knives or scraping devices, and prior art devices have not been of the simplified construction of the invention, nor capable of the accurate removal of conduit coatings wherein the conduit is not marked or damaged during coating removal.

SUMMARY OF THE INVENTION

It is common practice to coat buried conduits and pipelines to prevent corrosion of the pipeline due to stray electrical currents and other corrosive influences within the ground. Pipes and conduits are often coated with petroleum derivatives, or may be wrapped with a non-corrosive material. While such coating is effective to protect the buried conduit or pipe from corrosion, the coating material causes considerable inconvenience and added labor upon the attaching of fittings to the conduit. Many conduits use fittings welded, brazed or soldered to the conduit, and before the fitting can be attached to the conduit, the conduit surface must be cleaned of all foreign matter, including the coating. In the past such removal of the coating is normally accomplished by conventional handheld scrapers or knives, and the conduit is usually finally cleaned by an abrasive paper, or liquid solvent.

It is now common practice to use steel conduits of relatively thin, radial wall thickness in the transmission of utilities such as natural gas. Such thin wall, steel tubing finds particular use in installations between a main supply conduit and the user, such as a domestic dwelling. Because of the thin wall of such tubing, the necessity of the protective coating is apparent, in that the tubing could be quickly corroded through. Accordingly, a coating consisting of a mastic compound encompassed in a vinyl sheath is used. One of the serious problems that has arisen from the use of such thin wall conduit exists from damage inflicted upon the conduit adjacent its end during the removal of the coating, in order to permit a fitting to be attached to the conduit. With a thin wall conduit, even a slight scratch or nick produces localized stress points which significantly weaken the conduit and may form a point of failure. When using handheld knives and scrapers and heretofore available coating removing tools, extreme care has to be exercised in order to prevent damage to the conduit during coating removal. The invention pertains to a tool for removing the protective coating from the exterior surface of a conduit wherein the coating can be very effectively removed adjacent the conduit end without inflicting damage to the conduit.

The tool of the invention consists of an elongated body having a bore therein which, adjacent one end thereof, is of a diameter only slightly greater than the outer diameter of the conduit from which the coating is to be removed. The end of the tool includes two types of cutting edges. At the outermost tool end a coating incision type cutting edge is defined which radially penetrates the coating, and in the proper use of the tool will define a spiral strip of coating material which accumulates on the conduit during the covering removing operation. Immediately following the incision cutter, with respect to the axial movement of the tool body upon the conduit, is a scraping type cutting edge which removes much of the mastic coating from the conduit which has been initially exposed and partially removed by the incision cutter.

The tool body is of a hollow configuration and as the conduit covering is removed the cleaned end of the conduit is received within the body. The coating removing operation is produced by simultaneously rotating the tool body relative to the conduit, and maintaining an axial force upon the body to maintain the incision cutter in a feeding and engaging relationship with the coating. The rate of axial feeding of the body upon the conduit is determined by the end edge of the body which is obliquely related to the longitudinal body axis, and in effect, defines a spiral which determines the "pitch" of the cutting action of the incision cutter, and the rate of axial movement of the cutter on the conduit during operation.

In the practice of the invention it is important to protect the conduit against scratches or nicks which might be produced by inadvertent engagement of the conduit with the cutter or coating removal edges. In this regard, the tool is prevented from damaging the conduit in that the cutting and removal edges are defined upon the surface of the body bore, and thus are spaced a radial distance from the axis of the conduit sufficient to prevent injury to the conduit. To permit proper initial alignment of the conduit with the tool and tool bore, a guide gauge is located within the tool bore and is slidably received therein. The guide gauge includes an end adapted to be received within the bore of the conduit, and also includes an abutment edge adapted to engage the end of the conduit. The gauge extends beyond the end of the tool body, and thus aligns the conduit with the tool during the initial covering removal operation.

The guide gauge serves a dual purpose, in that after the gauge serves to axially align the conduit and tool, an abutment within the tool bore limits movement of the guide gauge therein during the tool operation at a predetermined degree of insertion of the conduit within the tool. Thus, the length of the guide gauge determines the axial length of the conduit end from which the coating will be removed.

A tool in accord with the invention is economical to manufacture and maintain, and proper use thereof requires only common mechanical knowledge and ability on the part of the operator.

BRIEF DESCRIPTION OF THE DRAWING

The advantages of the invention will be apparent from the following description and accompanying drawings wherein:

FIG. 1 is a perspective view of a conduit coating remover tool in accord with the invention, FIG. 2 is an enlarged plan, detail view of the cutting and coating removal end of the tool, FIG. 3 is an elevational end view of FIG. 2, FIG. 4 is a detailed, partially sectioned view of a tool and guide gauge as associated with a coated conduit upon the components being assembled immediately prior to the coating removal operation, FIG. 5 is a reduced scale plan view of a tool and conduit during removal of the coating, FIG. 6 is a diametrical, elevational, sectional view of the tool and conduit at the completion of the coating removal, and FIG. 7 is an elevational, sectional view taken along section VII—VII of FIG. 6.

DESCRIPTION OF THE PREFERRED EMBODIMENT

The general appearance of the tool in accord with the invention will be best appreciated from FIG. 1. The tool includes a generally cyclindrical body 10 having an exterior surface 12 upon which a knurled portion 14 is defined to facilitate gripping and turning of the tool. The body 10 is defined by an end 16 and an end 18. In the disclosed embodiment a cylindrical bore extends through the body defined by concentric cylindrical portions 20 and 22. The cylindrical portion 22 is of a diameter of approximately .002 inch greater than the outer diameter of a conduit from which the coating is to be removed. The bore portion 20 is of a greater diameter than the bore portion 22 as will be apparent in FIG. 6. A groove 24 is internally defined within the body 10 about the bore 20, FIG. 6, in which a snap ring 26 is formed to define an abutment for the guide gauge, as will be later described.

A portion of the tool body is removed adjacent the end 16 to define a cylindrical segment portion 28 of a circumferential extent greater than 180°. The disclosed configuration of the portion 28 is of advantage in that this configuration provides access to the cutting and coating removal edges to permit easy sharpening. However, it will be appreciated that the circumferential extent of the portion 28 may vary from approximately 180° to almost a full 360°, it being necessary in the practice of the invention only that an axial slot be present which is sufficient to define the cutting and coating removal edges.

The portion 28 includes an axially extending edge 30 which results from the intersection of oblique surface 32 with the bore portion 22. The surface 34 defines the other terminating edge of the portion 28. Adjacent the end 16 the portion 28 is provided with a concave notch 36 within surface 32 which results in a sharp incision edge 38 which has a radial dimension extending from the outer surface 12 of the body to the intersection with the bore portion 22. The concave configuration of the notch 36 forms the sharpened edge 38 which extends in an oblique circumferential direction, and the notched surface also forms a concave sharp edge 40 from the intersection with the bore portion 22.

The end 16 of the body 10 is defined by a surface which constitutes a circular segment, FIG. 3, and is obliquely related to the axis of the tool in an axial direction, FIG. 2. The end surface 16 is in the form of a spiral, and this surface determines the "pitch" of the feeding of the tool on the conduit during the coating removal operation.

A guide gauge 42 is used with the tool for alignment and gauging purposes. The gauge 42 includes a large cylindrical portion 44 which is adapted to be freely axially slidably received within the tool bore portions 20 and 22. The cylindrical portion 44 is defined by the gauge end 46 at the right, and a radially extending shoulder 48 at the left. A smaller diameter cylindrical portion 50 is formed upon the gauge and intersects the radial shoulder 48. The cylindrical surface 50 is of a diameter as to be closely received within the internal bore of a conduit to be cleaned. The outer end of the portion 50 is beveled to facilitate insertion into the conduit end.

A typical conduit 52 with which the invention is to be used is illustrated in FIGS. 4 through 7. The conduit 52 may be of steel having an inner cylindrical diameter 54 and outer cylindrical diameter 56. The conduit is encased within a vinyl sheath 58, and usually a mastic, or other similar composition 60 is "sandwiched" between the sheath and the outer diameter of the conduit which is of an adhesive nature and adheres to both the sheath and the conduit.

In operation, the guide gauge portion 50 is inserted into the end of the conduit 52 until the conduit end engages the shoulder surface 48. Thereupon the enlarged gauge diameter 44 is inserted in the tool bore 22, and will be thereby aligned with the axis of the tool 10. The outer diameter of the gauge portion 44 substantially corresponds to the outer diameter of the conduit 52, and therefore, the use of the guide gauge coaxially aligns the conduit with the tool. The operator then axially moves the conduit and tool toward each other until the incision cutting edge 38 engages the end of the conduit coating, namely, the end of sheath 58. The operator now rotates the tool body 10 in a clockwise direction while pushing the tool in the axial direction toward the conduit. The presence of the concave notch 36 helps to feed the tool into the conduit, and the unsevered portion of the coating will engage the tool end surface 16 and the surface 16 will regulate the axial depth of penetration of the cutter edge 38 into the coating and the rate of advance of the tool as it is rotated. The cutter edge 38 is of greater radial dimension than the radial thickness of the coating, and the sheath 58 will be removed as a continuous spiral strip as the tool is advanced over the coating. The "pitch" of the removed strip is determined by the oblique angle of surface 16 and the strip builds up in front of the tool as is apparent in FIGS. 5 and 6.

The majority of the coating which is not removed from the conduit in the form of a spiral strip, is removed as at 62, FIG. 5, by the convex notch surface 40 and the edge 30. In that only a very small radial clearance exists between the edge 30 and the outer diameter 56 of the conduit 52, the edge 30 will remove most of the mastic compound from the conduit outer diameter. The cutter edge 38 removes all of the vinyl sheath 58 and a considerable amount of the mastic, particularly that which adheres to the sheath. This operation occurs until the gauge end 46 engages the abutment ring 26, FIG. 6. At this time the operator rotates the tool 10 a turn or two to form a clean end at the coating which remains on the conduit which will be perpendicularly disposed to the conduit axis. It will, therefore, be appreciated that the length of the guide gauge portion 44 determines the axial length of the conduit which is cleaned of the coating by the tool. The bore portion 22 accurately "centers" the gauge 42 and conduit within the tool during the entire coating removal operation, and after the gauge portion 44 disengages bore 22 the conduit outer surface 56 itself will be guided by bore 22, FIG. 6.

The operator now withdraws the conduit 52 from the tool and, if desired, may clean any of the mastic which might remain on the conduit by the use of a solvent soaked rag, brush or emery paper. As the mastic 60 is very sticky and bonds to the conduit the enlarged bore 20 diameter prevents binding of the conduit within the tool during the coating removal operation, should any mastic coating not be removed by the edge 30.

As the bore portion 22 acts as a guide, and is of a circumferential extent greater than 180°, it will be appreciated that the bore 22 and portion 28 will prevent the sharpened edges of the tool from damaging the conduit and thus the use of the tool provides a very effective means for removing coating from a conduit in an accurate and controllable manner.

It is appreciated that modifications within the scope of the invention may be apparent to those skilled in the art and it is intended that the invention be defined only by the following claims.

I claim:
1. A tool for removing a protective coating from the exterior surface of a conduit adjacent the conduit end comprising, in combination, an elongated body having a longitudinally extending axis, an exterior surface and an end, a conduit guide including at least a partially defined cylindrical bore concentric with said body axis of a diameter slightly greater than the outer diameter of the conduit on which coating is to be removed defined on said body adapted to engage a conduit and maintain said body axis concentric to the engaged conduit, a coating cutter mounted on said body at said body end adapted to radially penetrate a conduit coating to form an incision therein for cutting and removing conduit covering by rotating said body relative to the engaged conduit and feeding said cutter into the conduit covering, and an axially movable guide gauge axially slidably received within said body cylindrical bore having an end adapted to be closely received within the end of a conduit and thereby coaxially align a conduit with said body axis prior to engagement of said body conduit guide with the conduit.

2. A tool as in claim 1 wherein said body end includes a radially disposed surface concentric to said body axis having an inner circular segment edge and obliquely disposed to said body axis, said radially disposed surface terminating at one end adjacent said conduit cutter and said edge thereof having a radius only slightly greater than the outer radius of the conduit on which coating is to be removed, said radially disposed surface engaging the conduit coating and regulating the axial advance of said cutter into the conduit coating as said body is rotated.

3. In a tool as in claim 1 wherein a conduit coating remover is mounted on said body adjacent said end disposed rearwardly of said cutter relative to the operative direction of axial movement of said body, said conduit coating remover comprising an axially extending edge radially disposed from said axis a distance only slightly greater than the outer radius of the conduit on which coating is to be removed.

4. A tool as in claim 1 wherein said body bore includes an abutment remote from said body end adapted to be engaged by said guide gauge and an abutment shoulder defined on said guide gauge adapted to be engaged by the end of the conduit from which coating is to be removed whereby engagement of said gauge with said bore abutment determines the axial extent of the conduit traversed by said coating cutter.

5. A tool for removing a protective coating from the exterior surface of a cylindrical conduit adjacent the conduit's end comprising, in combination, an elongated body having first and second ends and a longitudial axis, a cylindrical bore defined in said body intersecting said body first end, said bore being of a diameter adjacent said first end slightly greater than the outer diameter of the conduit from which coating is to be removed, a coating cutter mounted on said body at said first end adapted to radially penetrate a conduit coating to form an incision therein, a conduit coating remover mounted on said body adjacent said first end disposed rearwardly of said cutter relative to the operative direction of axial movement of said body while removing conduit covering by rotating said body relative to an engaged conduit axially aligned with said bore and relatively moving said conduit through said body bore first end toward said second end, said bore adapted to receive and guide a conduit having its cover cut and removed by said cutter and remover, and a radially extending surface obliquely disposed to said body axis defined on said body first end adapted to engage the conduit coating and regulate the depth of axial advance of said cutter as said body is rotated.

6. A tool as in claim 5 wherein said coating cutter and remover comprise sharp edges disposed at the bore of said body adjacent said first end thereof, said cutter including a sharp edge having a radial dimension and said conduit remover edge extending in the axial direction of said body.

7. A tool as in claim 6 including a cylindrical guide gauge slidably mounted within said bore and of a length less than that of said body, said gauge including an end portion adapted to be received within a conduit and engage the end thereof and align a conduit with said body bore.

8. A tool as in claim 7 wherein a stop abutment is defined in said body bore adjacent said second end and limiting movement of said guide gauge within said bore whereby engagement of said gauge with said abutment determines the axial extent of conduit movement past said cutter and coating remover into said body bore.

References Cited
UNITED STATES PATENTS

| | | | |
|---|---|---|---|
| 843,353 | 2/1907 | McKenna | 81—9.5 |
| 2,695,537 | 11/1954 | Imman | 81—9.5 |
| 2,897,702 | 8/1959 | Ghiglia | 81—9.5 |
| 3,204,495 | 9/1965 | Matthews | 81—9.5 |
| 3,330,036 | 7/1967 | Mahoney | 81—9.5 |
| 3,398,610 | 8/1968 | Matthews | 81—9.5 |

ROBERT C. RIORDON, Primary Examiner

J. C. PETERS, Assistant Examiner

U.S. Cl. X.R.

30—279, 287